(12) United States Patent
Wu

(10) Patent No.: US 7,558,876 B2
(45) Date of Patent: Jul. 7, 2009

(54) ENHANCED INFORMATION AND PRESENCE SERVICE

(76) Inventor: Jonathan Wu, P.O. Box 11605, Stanford, CA (US) 94309

( * ) Notice: Subject to any disclaimer, the term of this patent is extended or adjusted under 35 U.S.C. 154(b) by 513 days.

(21) Appl. No.: 11/301,492

(22) Filed: Dec. 12, 2005

(65) Prior Publication Data

US 2006/0090005 A1    Apr. 27, 2006

(51) Int. Cl.
G06F 15/173    (2006.01)
H04M 1/247    (2006.01)

(52) U.S. Cl. .................. 709/238; 709/203; 709/217; 709/218; 709/202; 455/414.1; 455/414.4; 455/412.1

(58) Field of Classification Search .............. 709/203, 709/217, 202, 218, 238; 455/414.1, 414.4, 455/412.1
See application file for complete search history.

(56) References Cited

U.S. PATENT DOCUMENTS

| | | | | |
|---|---|---|---|---|
| 5,991,806 A * | 11/1999 | McHann, Jr. | ................ | 709/224 |
| 6,039,245 A * | 3/2000 | Symonds et al. | ............ | 235/379 |
| 6,044,403 A * | 3/2000 | Gerszberg et al. | ........... | 709/225 |
| 6,170,015 B1 * | 1/2001 | Lavian | ................ | 709/232 |
| 6,260,083 B1 * | 7/2001 | Moore et al. | ................ | 710/33 |
| 6,473,609 B1 * | 10/2002 | Schwartz et al. | ............ | 455/406 |
| 6,480,860 B1 * | 11/2002 | Monday | ................ | 707/102 |
| 6,732,175 B1 * | 5/2004 | Abjanic | ................ | 709/227 |
| 6,785,730 B1 * | 8/2004 | Taylor | ................ | 709/230 |
| 6,842,903 B1 * | 1/2005 | Weschler | ................ | 719/328 |
| 6,847,999 B1 * | 1/2005 | Dodrill et al. | ................ | 709/225 |
| 6,961,712 B1 * | 11/2005 | Perkowski | ................ | 705/27 |
| 7,058,076 B1 * | 6/2006 | Jiang | ................ | 370/465 |
| 7,130,854 B2 * | 10/2006 | Beadles et al. | ................ | 707/10 |
| 7,212,543 B1 * | 5/2007 | Arwald et al. | ................ | 370/466 |
| 7,219,136 B1 * | 5/2007 | Danner et al. | ................ | 709/219 |
| 7,272,644 B1 * | 9/2007 | Kumar | ................ | 709/223 |
| 7,308,484 B1 * | 12/2007 | Dodrill et al. | ................ | 709/218 |
| 7,330,824 B1 * | 2/2008 | Kanojia et al. | ................ | 705/14 |
| 7,406,515 B1 * | 7/2008 | Joyce et al. | ................ | 709/224 |
| 2001/0056401 A1 * | 12/2001 | Tompkins | ................ | 705/42 |
| 2002/0160790 A1 * | 10/2002 | Schwartz et al. | ............ | 455/456 |
| 2002/0198974 A1 * | 12/2002 | Shafer | ................ | 709/223 |
| 2004/0043770 A1 * | 3/2004 | Amit et al. | ................ | 455/450 |
| 2005/0240659 A1 * | 10/2005 | Taylor | ................ | 709/217 |

OTHER PUBLICATIONS

U.S. Appl. No. 10/033,097, Jonathan Wu.
U.S. Appl. No. 60/242,045, Jonathan Wu.

* cited by examiner

Primary Examiner—Alina N. Boutah
(74) Attorney, Agent, or Firm—Lumen Patent Firm

(57) ABSTRACT

A network-based system for routing data between software applications with access to the network is taught, the system including at least one router connected to the network for routing between applications and the router, software in the router for creating and deleting routes and for converting incoming data of differing markup languages into a common format, at least one client device connected to the network, the device adapted for communication with the router, and software in the client device for determining how data sent to its host device is rendered for use by the device. The client device receives data from the router in the form of the common format wherein the receiving device reads the data, builds an object model from logic instructions embedded in the data and executes the object model to implement the logic at the device for data rendering.

14 Claims, 6 Drawing Sheets

ENHANCED INFORMATION AND PRESENCE SERVICE

CROSS-REFERENCE TO RELATED DOCUMENTS

The present application claims priority to co-pending non-provisional Patent Application Ser. No. 10/033,097, filed on Oct. 19, 2001, which claims priority benefit under 35 U.S.C. 119(e) of Provisional Patent Application Ser. No. 60/242,045 filed on Oct. 20, 2000, and incorporates all disclosure of the prior application by reference.

FIELD OF THE INVENTION

The present invention is in the fields of Internet communication including topic subscription, messaging, and presence reporting and pertains particularly to a method and apparatus for enabling an enhanced information and presence reporting service.

BACKGROUND OF THE INVENTION

Communication methods and technologies used over data-packet-networks have continually undergone evolution with the advent of new protocols, markup languages, and compression technologies. The well-known Internet network represents the most extensive and commonly used data-packet-network for communications. Network-based communications applications are available, which enable people and corporations to subscribe to and report presence information and subscribed information in near real time.

More recently, popular handheld, Internet-capable, devices such as the Palm™, Bluetooth™, and Internet-capable cellular telephones have been utilized as client devices capable of subscribing to and posting information wirelessly in interaction with service equipment and Web-based software applications hosted on the Internet by various service providers.

At the time of the writing of this application, there is no practical method for mobilizing web applications and enterprise data for use on handheld devices in an integrated fashion. One reason for this is proprietary considerations in software development and complexities of attempting to integrate various markup languages and proprietary Web-based service models.

One attempted solution for providing viable Web-integration of applications for Web-enabled devices of disparate platforms and capabilities is the use of a proxy server. A proxy server is a server application that resides between a client applications and a real server. The generic function of the proxy is to intercept all requests from a client to a real server and attempt to fill the requests without the help of the real server. If the proxy cannot fill a request, it will forward the request on to the real server. The way proxy servers are used in messaging and presence service architecture is to retrieve content from, for example, the Internet on behalf of a client per client request. The proxy receiving the requested data then attempts to parse out specific portions of the content (content filtering) that are not compatible with a particular user's access device display requirements, which must be known to the proxy. After filtering the data, the re-purposed content from the Internet is delivered to the client's mobile device.

One drawback to the proxy method is that processing data for display on disparate user devices requires considerable processing power within the proxy server. Another obvious drawback to the proxy method is that the proxy requires a set of defined rules for filtering data for a particular type device. Often the rules for parsing data are rather loose resulting in re-purposed data that is generally unappealing in format and presentation attributes due to lack of customization options for data presentation. If strict rules are provided to the proxy, a substantial amount of time is required to define them from the developer's point of view.

One other way to provide universal integration of applications for custom presentation to mobile devices is to use Extensible Markup Language (XML) in conjunction with an XML transforming language known in the art as Extensible Stylesheet Language Transformations (XSLT), which is a transformation vocabulary used to specify how to create new structured information from existing XML documents. XML content is transformed for use on a particular device through the application of customized style sheets (CSS), and delivered to users.

Yet another approach to presenting appealing customized information is the creation of content specifically for a target device. The well-known Palm Query Application (PQA) format is one example of this approach. Variants of these formats exist. A drawback with PQA is that it only supports Palm devices and is fairly generic with respect to multiple versions of the device. Complex definition of strict parsing rules applies to the XML/XSLT and the PQA techniques as well as the proxy technique described above. Moreover, it is noted that in all of these approaches, server-side processing is considerable.

The problems with content presentation to mobile devices exist principally because there is no common and standard set of rules for building Web-applications that run on small wireless devices. Furthermore, prior-art solutions focus on sever-side capability and provide no programmability on the client side of interaction.

Therefore, what is clearly needed is a method and apparatus for building customized Web-applications that are usable at the client-side of an information and presence subscription service and delivery system wherein processing requirements can be distributed among clients. A system such as this would ensure that requested content is optimally presented to mobile devices regardless of device type while reducing server-side processing requirements.

SUMMARY OF THE INVENTION

A network-based system for routing data between software applications with access to the network is provided. The system comprises at least one router connected to the network for establishing and maintaining routes between the router and the applications according to request; a first version of software residing in and executable from the at least one router for controlling route creation and deletion and converting incoming data of differing markup languages into a common format; at least one client device connected to the network, the at least one device adapted for communication with the at least one router; and, a second version of software residing in and executable from the at least one client device for determining how data sent to its host device is rendered for use by the device.

Data requested by the at least one client device is sent to the requesting device from the at least one router in the common format wherein the receiving device reads the data, builds an object model from logic instructions embedded in the data received and executes the object model to implement the logic at the device for rendering the data. In a preferred embodiment, the network-based system is practiced on the Internet network.

Applications receiving information, in a preferred embodiment, comprise both network applications and client applications. The software applications subscribe to data according to a shared topic. In one embodiment the at least one client device is a mobile device connected to the network through a wireless network. Also in the case of more than one client device, the devices comprise a mix of different types and platforms.

In a preferred aspect of the invention, the second version of software is a distributed server application having full Web browser functionality. In this embodiment the logic instructions embedded is data received by the at least one client device are JavaScript instructions and the object model created from them is an executable JavaScript object.

In one aspect, query applications developed using HTML and embedded JavaScript carry message data of the form of XML or SOAP. In a preferred aspect, the common format of data sent from the at least one router is compact markup language. In this aspect, the message data comprising a response to a request is XML.

In another aspect of the present invention, a server application is provided and distributed to a client device for enabling the client device to interact with an information and presence service hosted on a data-packet-network. The server application comprises a data-interpretation module for interpreting data sent to the device from the service and for creating an object model from any logic instructions embedded in the data; a run-time engine for executing the created object model; and, a data-rendering module for applying the logic resulting from execution of the object model to the function and display devices supported on the client device.

The server application enables a user controlling the device to control how data is rendered in conjunction with the display and function attributes of the device through creation of unique query applications used by the device in requesting the data.

In a preferred aspect, the data-packet-network hosting the information and presence service is the Internet network. Also in a preferred aspect, message data is propagated between the service and the client device using the query application and response format. In one aspect, the query applications contain logic instructions executed on the client side, the logic instructions developed by the client.

In one aspect, the query applications are developed using HTML and JavaScript. In a preferred aspect, the query applications contain differing logic instructions developed to render response data differently according to different data sources. In one aspect, the client device is a mobile device connected to the network through a wireless network.

In one embodiment, the server application further comprises the necessary software to provide full Web browser functionality to the client device. In a preferred aspect of the server application, the object model is a JavaScript object and the run-time engine is a JavaScript run-time engine. In this aspect, the request message data is of the form of XML for SOAP. Also in this aspect, the data sent to the device is of the form of compact markup language and the data-interpretation module decompresses the data before interpretation and object building.

In still another aspect of the present invention, a method for client-side control of how data is rendered on a client device interacting with a Web based information and presence service is taught. The method includes steps of (a) providing a server application capable of object modeling and object execution to reside and execute on the client device; (b) providing an HTML template and JavaScript library to the client for use in developing query applications that contain data rendering logic; (c) developing a query application containing a message requesting data and logic instructions for data rendering; (d) sending the query application to the information and presence service; (e) receiving a response from the service, the response containing message data and the data rendering logic; (f) interpreting the data response and building a JavaScript object representing the logic instructions; and (e) executing the JavaScript object and applying the results to render the message data according to display and function of the device according to the logic instructions.

In a preferred application of the method, in step (a) the server application includes full Web browser functionality. In this aspect in step (a) the client device is a mobile device and connects to the service through a wireless network. Also in a preferred application of the method, in step (c) the message requesting data is of the form of XML or SOAP.

In one application of the method, in step (d) the query application is specific to particular data source hosted by the service and in step (e) the response is of the form of a compact markup language rendered from a traditional markup language. In a preferred aspect, in step (e) the response is compressed for transport and in step (f) the response is decompressed before interpretation.

Now for the first time, an information and presence service architecture and software model is provided wherein the client has control over custom data rendering and server-side processing is reduced through distribution of server functionality to the client.

BRIEF DESCRIPTION OF THE DRAWINGS FIGURES

DETAILED DESCRIPTION OF THE PREFERRED EMBODIMENT

Figure 1:
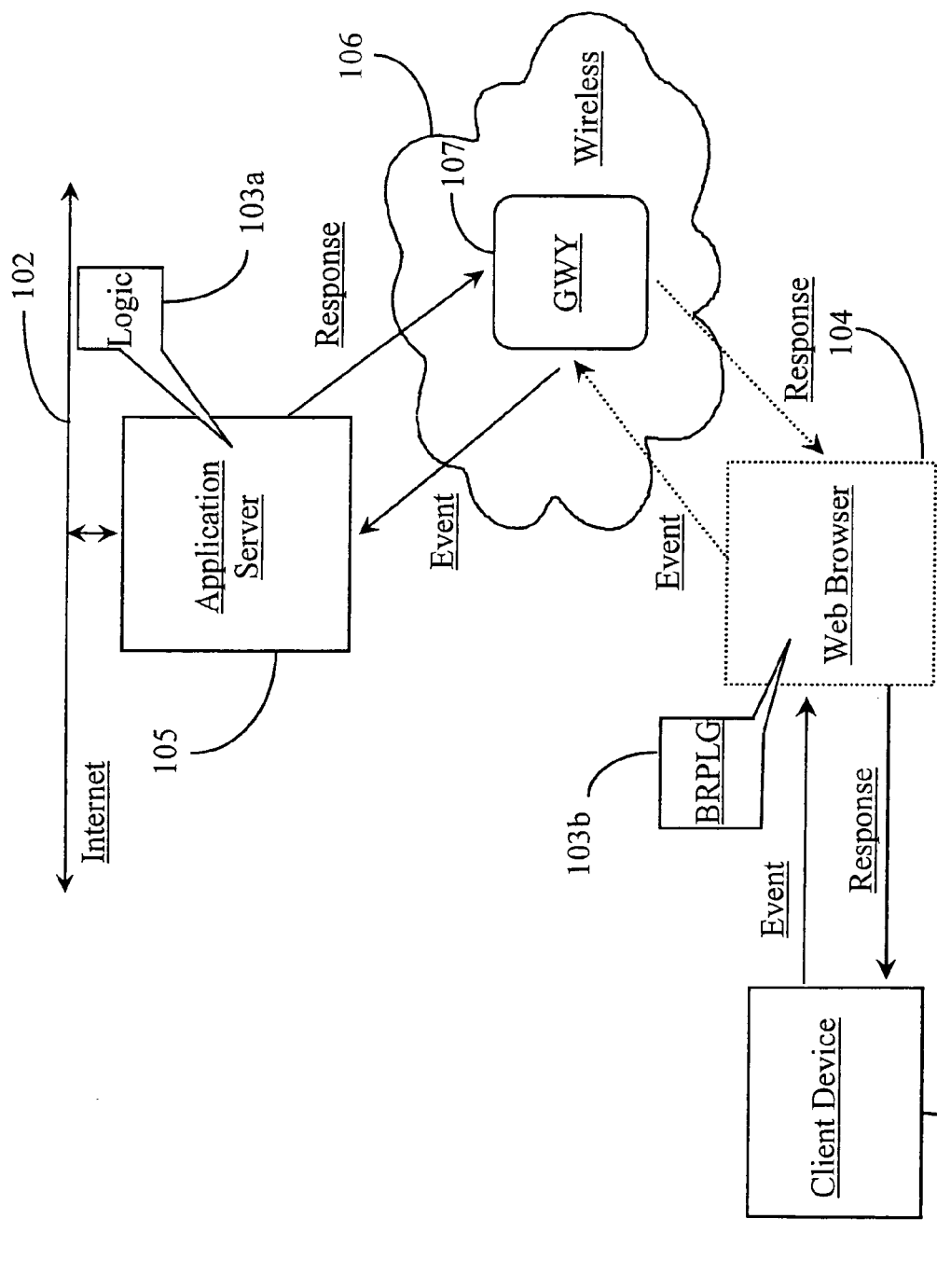
FIG. 1 is a block-diagram illustrating basic components of a wirelessly accessible Web-based presence and information service according to prior art.

FIG. 1 is a block-diagram illustrating basic components of a wirelessly accessible Web-based presence and information service according to prior art. As was described with reference to the background section of the specification, there are a variety of information and presence services available on the Internet network. In this prior art example, basic components of such a service are described. The two main communicators of an information and presence service are a client device, illustrated in this example as client device 101, and an application server illustrated herein as application server 105.

Application server 105 is typically hosted on the Internet network represented herein by a double arrow given the element number 102 and labeled the Internet. Application server 105 can be a main server providing the functionality of the information and presence service, or it may be a proxy server setup between clients and a main server. Application server 105 is illustrated as having a logical connection to Internet 102. Client device 101 can be any handheld device operating in a wireless mode and having Internet connection capability.

A wireless network 106 represents any wireless network that a client uses to access Internet 102 from device 101. A carrier gateway (GWY) 107 is illustrated in this example within the domain of network 106. Gateway 107 is adapted to receive and send communication from and to Internet 102 over land-lines and to send and receive communication from to and from client device 101 in wireless mode.

Client device 101 has a Web browser 104 adapted to enable the device to access Internet 102. Web browser 104 is illustrated separately from client device 101 for illustrative purposes only. In prior art implementation (depending on the service) browser 104 may be a thin mini-browser plug-in provided by a host of the information service, or may simply be a generic Web browser installed on device 101. The functionality of information and presence services revolves around a server/client software application illustrated in this example as software application 103a (server) and 103b (client). Server application 103a includes logic for processing events and responses and for configuring responses to particular display type of client device 101. Client application 103b can be a browser plug-in (BRP LG) as is illustrated in this example, or it may comprise the entire Web browser 104. This again depends upon the nature of the service offered.

In typical operation of the architecture as presented in this example, client device 101, assumed to be a subscriber, initiates a request event through Web browser 104 with the aid of client 103b. The request is generally of the form of a hypertext-transfer-protocol (HTTP) request. Web browser 104 establishes communication with application server 105 through gateway 107 and wireless network 106 and propagates the request event to application server 105. The request portion of the illustrated transaction is illustrated herein by the directional arrows labeled Event, one of which is broken to show wireless propagation.

Application server 105 receives the request from client device 101 and processes that request with the aid of software 103a. If application server 105 is a proxy server an additional communication they be required between the proxy and a main application server. In any event information from Web pages written in one or more formats for wireless devices may be accessed by application server 105 or be maintained within application server 105. One responsibility of application server 105 is to utilize server application 103a in formatting a response to the request event received, the format applicable and displayable on client device 101. A response sent from application server 105 as a result of receipt and processing of the request event is illustrated in this example by directional arrows labeled Response, one of which is broken to show wireless propagation.

In this prior art example all of the processing capability required to process requests from device 101 into appropriate responses that can be disseminated by the device is contained in application server 105 and represented by server application 103a. Client application 103b has no important processing capabilities other than to render the data received to the display mechanism of device 101. In some prior-art cases, some functionality may be burned into the memory of client device 101 however, this is typically limited to services that support only one type of device and format.

In this example a user operating client device 101 has no control over how information will be displayed or presented on device 101. All query application formats and device presentation configurations for those formats are developed for and managed at application server 105. A client-operating device 101 cannot dynamically change the way data is presented on his device according to preference unless the particular change option is supported and recorded in application server 105 an executable by a preset code or signal initiated by device 101.

As previously described with reference to the background section, support of many different wireless markup languages and devices requires sets of rules to be defined and established at server 105 per format and device display parameters. If these rules are loosely defined then re-purposed content sent from application server 105 to device 101 may be unappealing when displayed on client device 101. If they are strictly defined significant time and effort in development and processing is required for maintenance and implementation of the rules. Likewise, prior-art applications are created by developers with considerable skill in the art of the more complicated program languages such as Java and C++. A goal of the present invention is to provide an information and presence service that can be enabled using applications written in simple HTML and JavaScript formats. A further goal of the present invention is to reduce the amount of required processing capabilities related to defining and implementing rules for markup language resolution and display presentation formats at the server side by disturbing those capabilities to individual client devices.

Figure 2:
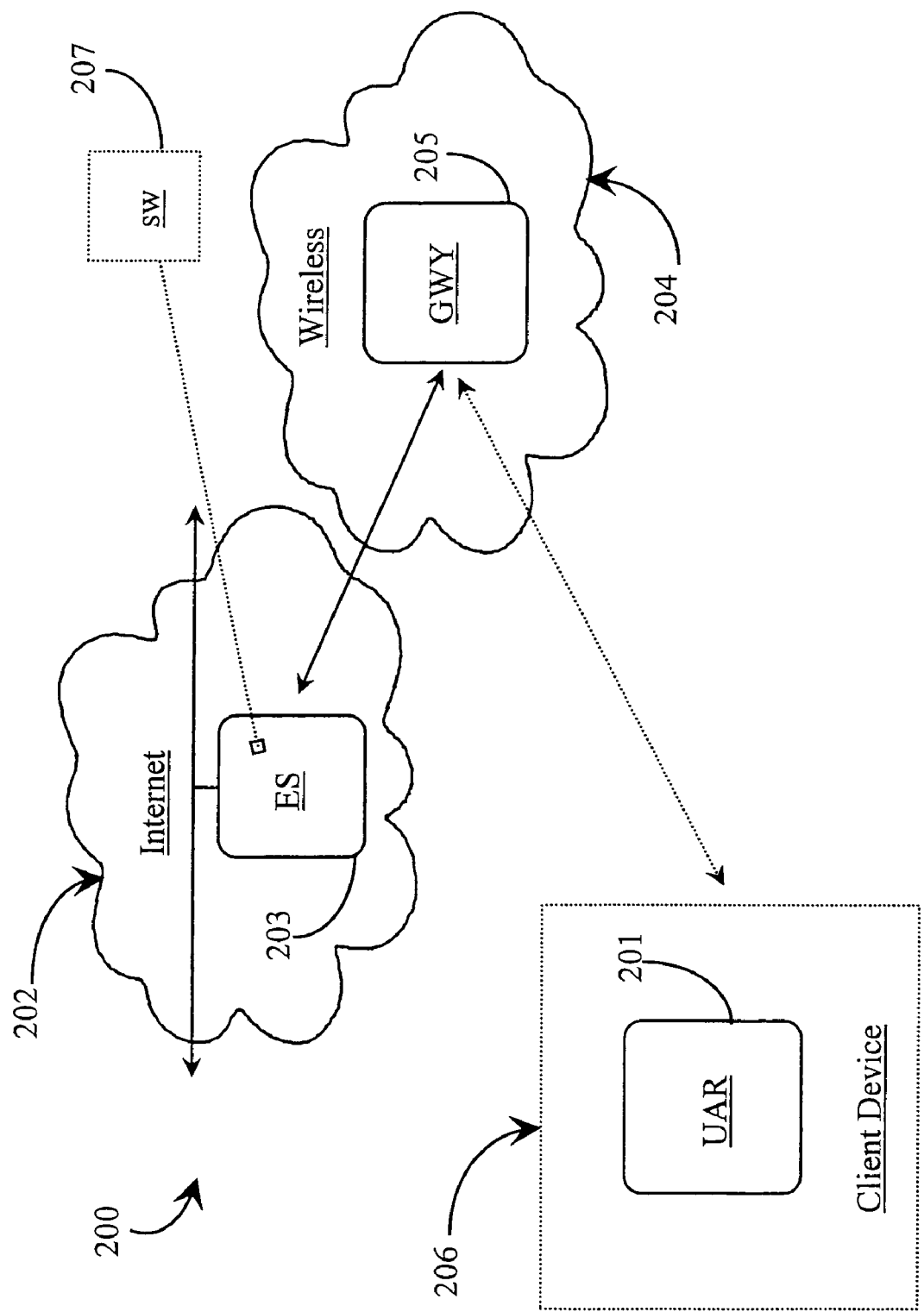
FIG. 2 is a block-diagram illustrating basic components of a wirelessly-accessible Web-based presence and information service according to an embodiment of the present invention

FIG. 2 is a block-diagram illustrating basic components of a wirelessly accessible Web-based presence and information service 200 according to an embodiment of the present invention. Service 200 is in a preferred embodiment, is a complete information, presence, and messaging service that specializes in facilitating a group of clients (subscribers) who access the service through a variety of Internet-capable appliances in wireless mode. Service 200 is exemplified in this example by an illustrated edge server (ES) 203, a wireless gateway (GWY) 205, and a client device 206. Edge server 203 replaces application server 105, which was described with reference to FIG. 1 above. Edge server 203 is illustrated within an Internet network cloud 202 and is connected to an Internet backbone exemplified herein as a bi-directional arrow extending through cloud 202.

Edge server 203, unlike application server 105 described with reference to the prior art example of FIG. 1 is adapted mainly as a router that establishes routes between listeners (subscribers) to the service and information topics established according to universal resource identifiers (URIs). More detail regarding the routing function of edge server 203 will be provided further below.

Unlike application server 105, edge server 203 does not contain the equivalent of logic 103a described with reference to the prior art example of FIG. 1. That is to say that software and processing capability dedicated to establishing and defining complicated rules sets for data display on various devices is not required and in a preferred embodiment is not present within edge server 203. Instead, edge server 203 has a comparatively simple software (SW) instance 207 provided therein and adapted primarily to facilitate the carrier or routing functions of service 200.

SW 207 is adapted to disseminate incoming data content of the forms of disparate markup languages used such as wireless markup language (WML), CHTML (chunks of HTML), and HTML among others arriving into the server and is adapted to render the data into a bit-compacted and simple format known to the inventor as a "quick format" or compact markup language (CML) that supports XML messaging and object manipulation. Software 207 optimizes traffic sent into a wireless carrier's network exemplified in this example by a wireless network cloud 204 and gateway 205. In this example, edge server 203, with the aid of SW 207 intercepts all content requests from client device 206, discovers the required and relevant data, formulates a response in XML that is rendered in the quick format (CML). The result is that updated content requested by clients can be populated into an existing HTML template of an original request.

Client device 206 has a novel instance of universal application runtime (UAR) 201 provided thereto which in a preferred embodiment is downloaded to the device from a host of service 200 during the process of setting up a subscription. UAR 201 is also referred to as a "micro server application" and in some instances as a "quick manager application" and may be referred to using these titles hereinafter in this specification. Micro server 201 has the capability of interpreting incoming data rendered in the above-mentioned quick format (CML), and creating a JavaScript object model of documents contained in a query application (QA). Sever 201 is JavaScript-enabled and is adapted to process (execute) the created objects to obtain a customizable and optimal display model for displaying the received data and graphics on any particular enabled requesting device, device 206 in this case. Gateway 205 and wireless network 204 in this example are analogous to gateway 107 and wireless network 106 described with reference to the prior art example of FIG. 1 above.

Micro server 201 is, in a preferred embodiment, a mini browser application containing all of the required network browsing capabilities for network navigation. However, in one embodiment micro server 201 may be a browser plug-in to an existing browser, in which case the server is adapted to combine existing browser capabilities with the novel capabilities of the invention.

A main and novel difference between service 200 of this example and the service of the prior art example described with reference to FIG. 1 is that the processing power normally required at server-side for initiating and implementing device display parameters for adequate display of data sent to requesting devices is distributed to each subscribed device and therefore performed locally (client side) instead of at the server. Therefore edge server 203 may be provided in a much more streamlined fashion in terms of required processor resource than prior-art application servers that do everything locally.

Micro-server 201, although somewhat heavier than a state-of-art "thin browser client" used as a client in many wireless service applications at the time of the writing of this specification, does not require Java, Active-X or other heavier client-side code modules. Therefore, it is not significantly heavier and does not noticeably degrade or impede performance of a host device. More detail regarding the components and functions of micro server 201 are provided further below.

Figure 3:
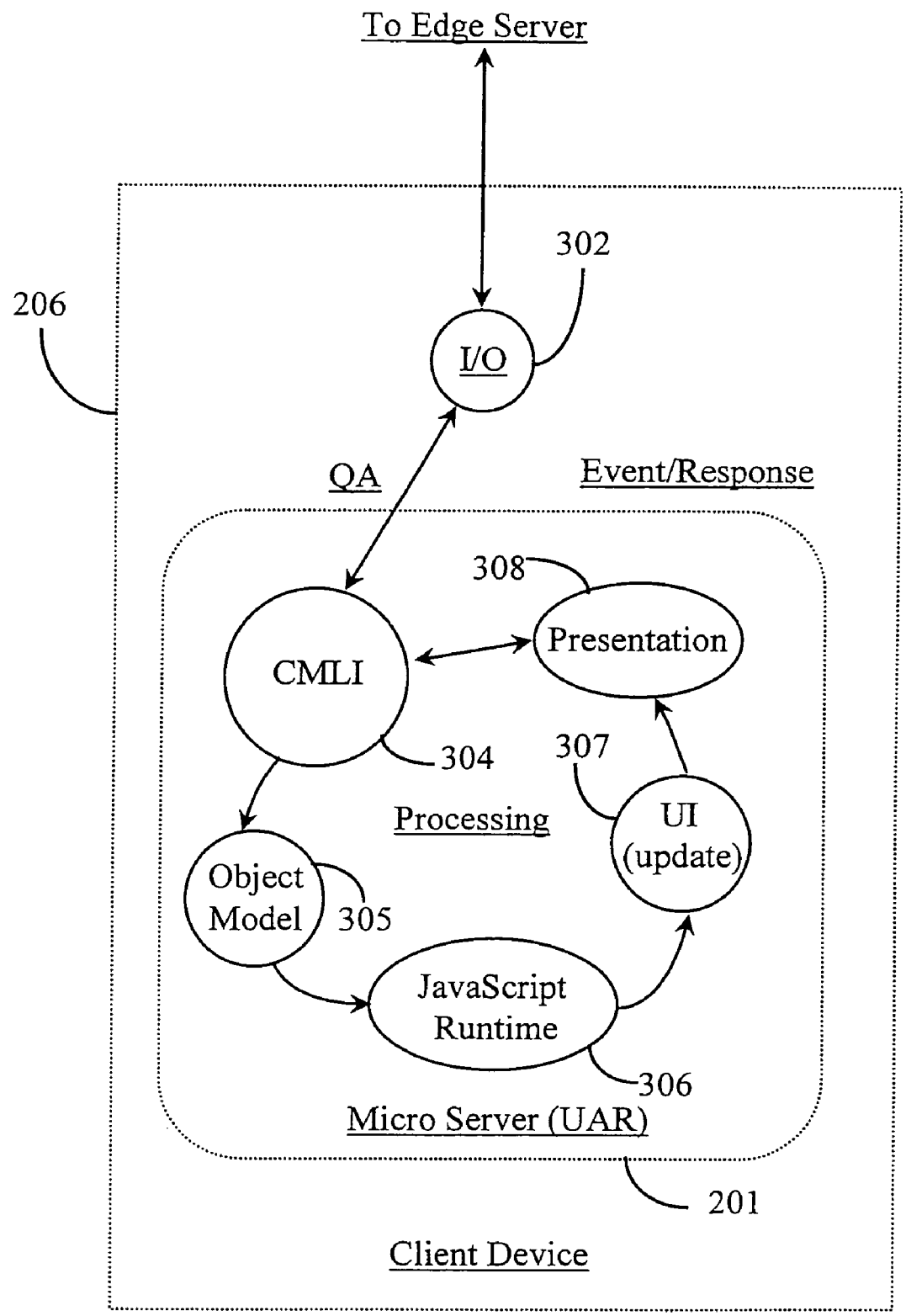
FIG. 3 is a block diagram illustrating components and processing capability of a programmable client application according to an embodiment of the present invention.

FIG. 3 is a block diagram illustrating components and processing capability of micro server 201 of FIG. 2 according to an embodiment of the present invention. Micro server 201 (enclosed in broken rectangular boundary) comprises 3 main components that interact with each other to provide the processing power and intelligence for optimizing data rendering and display. These are a compact markup language (CML) interpreter (I) or (CMLI) 304, a JavaScript runtime engine 306, and a data presentation layer (Presentation) 308.

An input/output (I/O) 302 is logically illustrated on device 206 to represent communication with an edge server analogous to edge server 203 of FIG. 2 above. Communication is of course bi-directional as represented by an illustrated double-arrow labeled To Edge Server. As previously described, the service of the present invention is HTTP request/response-based as is the format for Internet device communication. Micro server 201 enables mobile users to download, cache, and access QAs using any device. CML interpreter (CLMI) 304 enables the Universal Application Runtime (micro server) to read the basic QA format pioneered by Palm™ (PQA). However, server 201 should not be construed as limited in parsing capability to the well-known PQA format as other QA formats known to the inventor are also supported. Currently, the basic PQA format allows application developers to create static HTML applications (with no application logic), which is considered a major weakness of the format. The capability of micro server 201 allows developers to create dynamic applications (with application logic).

CMLI parses and interprets dynamic applications (QAs written for micro server 201 ) received through I/O 302 as illustrated by the bi-directional arrow illustrated between I/O 302 and CMLI 304. Once, decompressed, parsed and interpreted, CMLI 304 creates a Java Script object model, illustrated herein as object model 305, from the documents contained in a particular QA that describe logic execution instructions. CMLI 304 renders object model 305 to JavaScript runtime engine 306 as illustrated by the associated directional arrows.

Description of static HTML user interfaces (UIs) interfaces is supported in standard QA format but JavaScript modeling is not. However, logic may be described in a QA and a model may be created from the description. This is the basic function of CMLI 304. JavaScript runtime engine 306 executes object model 305 and provides, as a result, a set of common UIs (user interfaces) for system level calls to device 201. Therefore application logic is supported by UAR 201 including application level functionality that includes but is not limited to persistent storage capability, file system access on the host device, and system level I/O.

In prior art, QA formats such as PQA are limited to a relatively primitive form of bit-packed compression for transport. In prior-art practice, HTML pages are encoded and decoded using a simple lookup table. While the compression format allows network carriers to achieve a respectable amount of bandwidth savings, dynamic content is not well supported. Micro server 201 supports XML messaging and manipulation of XML objects in the CML format. JavaScript support empowers users to manipulate presentation preferences at the client side of service interaction. Using HTML and JavaScript, application developers have a lightweight and simple framework to develop true dynamic QAs.

In prior art, the basic QA format does not allow abstraction concerning the complex development attributes for rendering one format of data to multiple devices. For example, in PQA only Palm devices are supported. Micro server 201 is capable of abstraction to a level of obfuscating the usual complexities of developing web applications for disparate devices. Because micro server 201 has system-level knowledge of a devices profile (screen size, display capabilities, etc), it is able to shape the view of a particular application to the device dynamically. Application developers can therefore program applications against a single interface defined in HTML and expect universal compatibility among devices enabled with micro server 201. In addition, clients can execute a single application on multiple devices having different display capabilities using one runtime execution.

Referring now back to FIG. 3, the previously described set of UIs created from object processing by JavaScript runtime engine 306 is output as a UI update illustrated herein as UI (update) 307 to presentation layer 308 for optimal data and graphics rendering of content received by device 206. Associated directional arrows illustrate the execution and rendering of UI update 307 to presentation layer 308. It is noted herein that a user may program into the device the way he or she wants data displayed by inputting his or her own HTML/ JavaScript QA application into device 206.

Object models (305) may, of course, be persistently stored and re-used instead of having to create new JavaScript objects each time data is received for display at device 206. A user may also customize display parameters according to certain ones of a plurality of interactive data sources. For example, a user may develop a QA for receiving data from one source that has markedly different display and data rendering instructions than a QA created by the same user for interaction with another source. There are many possibilities.

Because developers may create dynamic applications without being required to have skill in the art in writing the more complex developers languages described further above, users that can write basic HTML and JavaScript do not have to rely on third party developers for their function options including display-customization and configuration options.

Quick HTML(Developers)

In order to facilitate the unique client-side function of micro server application 201 and service communication parameters as a whole, QAs are written in what is known as Quick HTML, which is essentially a simple form of HTML complimented with a library of JavaScript for logic description which can be embedded into the HTML template. Any user that can write HTML can use Quick HTML. The library of JavaScript is included at the beginning of an HTML template.

The service-request functionality comprises 3 basic functions. These are subscribe, unsubscribe, and publish. Subscribing to a topic involves specifying a topic to listen to and a JavaScript function that is called up and executed when a message occurs on the selected topic. Unsubscribe to a topic simply means that a selected topic for listening to is deselected for listening to. Publishing involves selecting a topic and posting a message associated with the topic. The message is distributed to all subscribers of the topic. An example code for subscribing to and listening to a topic appears as follows:

```
<script>
topic = "/foo/bar";
desto_subscribe(topic,onMessage);
function onMessage(event)
{
    alert(event.desto_payload);
}
</script>
```

The term Desto used in the syntax refers to a brand name applied to the service of the present invention and may be repeated in script examples throughout this specification. As was previously mentioned in this specification, service 200 functions around a system of topics, events and routes. Topics contain events and routes. Events are sent to a topic and the topic will forward events along all of its routes. A route can point to another topic or to a generic listener. A topic is identified by a URI as previously described above. An example would be "/workorder/update/xml". To avoid name conflicts, the topic names begin with domain names.

Quick HTML as known to the inventor is a set of JavaScript files that are included in developers HTML Web pages. These files make available a set of objects and functions that are used to enable subscription, unsubscription and sending of events.

A developed Webpage for a subscriber is activated with an onMessage. Following is a syntax example of a subscription to a topic:

```
function= desto_subscribe(from, to [, options] [, id])
from
to
    string
    function
    object
options
``` wherein "from" refers to a topic to listen to for example, "/workorder" and "to" referrs to a "listener".

The types of parameters associated with "to" include "string", a URL, for example, "/patient/status/update", function, which is the name of the function that receives messages on the Web page, and object, which is the object in the Web page that receives the messages and is set to onMessgage.

Options refer to optional functions, which is a JavaScript object having valid parameter options as follows: do_max_ age: Requests the delivery of events that have occurred in the past and are younger than the specified maximum age in seconds. The value of Infinity can be used to specify all previous events. Do_max_n refers to the maximum number of recent events to be delivered. These events, and all future events, will be delivered to the specified destination. ID refers to optional. ID of a route. This can be used to change options of an existing subscription. If a subscription is changed, events might be re-sent based on the value of do_max_age. If a subscription is changed, the 'from' parameter must match the original subscription. The ID should be a globally unique ID. If not specified, the server will generate a unique ID.

An example of an instruction to unubscribe to a particular topic is as follows:

```
var route;
route = desto_subscribe("/patient",onPatientMessage);
// route == "/patient/desto_routes/46165443"
desto_unsubscribe(route);
```

An example of an instruction for publishing is as follows:

```
function = desto_publish(to, event)
to
event
desto_payload
desto_id
desto_expires
other
``` wherein "to" refers to destination topic and "event" refers to the published event object, properties of which include the payload (text string to send). Other properties of "event" are "id" (unique), expires (the time at which the event expires and is removed from the system), and "other". Other refers to a custom value that can be created and added.

XML and SOAP

Service 200 supports sending and receiving of both XML and SOAP based messages. Furthermore, there is support for converting received XML and SOAP messages into JavaScript objects.

SOAP is a lightweight protocol known in the art and developed for exchange of information in a decentralized, distributed environment. It is an XML based protocol that consists of three parts. SOAP has an envelope that defines a framework for describing what is in a message and how to process it, a set of encoding rules for expressing instances of application-defined data-types, and a convention for representing remote procedure calls (RPCs) and responses representing system to system (application to application) communication. Once the message documents are rendered into JavaScript objects such as object 305 described with reference to the example of FIG. 3, accessing the properties within the XML or SOAP message becomes extremely simple.

Sending XML and SOAP messages from client device 206 is as simple as sending a JavaScript object via one of 2 available functions desto_publishAsXml or desto_publishAsSoap.

For example:

```
function postPatientStatus( )
{
var obj = new Object( );
obj.fname = "Dimpled";
obj.lname = "Chad";
obj.status = "surgery";
desto_publishAsSoap("/patient","patientupdate",obj);
}
```

When an edge server such as ES 203 of FIG. 2 receives a POST such as the one immediately above, the object that was sent in the message is accessed from the "body" property of the message. Sub-properties are accessed via the same names as in the original object. For example: msg.body.patientupdate.fname and msg.body.patientupdate.lname.

When publishing an object as XML or SOAP, it is required to provide the name of the object. For XML messages, this becomes the root tag of the document that is sent, and will be the name used to access the data when the message is received. For SOAP messages, this will become a sub-element of the Body sub-element.

For example, the following properties:

```
patientupdate.fname = "Dimpled";
patientupdate.lname = "Chad";
patientupdate.status = "surgery";
``` would generate the following XML:

```
<patientupdate>
    <fname>Dimpled</fname>
    <lname>Chad</lname>
    <status>surgery</status>
    <location>Operating Room 8</location>
</patientupdate>
``` and would generate the following SOAP:

```
<SOAP-ENV:Envelope
    xmlns:SOAP-ENV='http://schemas.xmlsoap.org/soap/envelope/'
    SOAP-ENV:encodingStyle='http://schemas.xmlsoap.org/soap/encoding
/'>
    <SOAP-ENV:Header></SOAP-ENV:Header>
    <SOAP-ENV:Body>
        <patientupdate>
            <fname>Dimpled</fname>
            <lname>Chad</lname>
            <status>surgery</status>
            <location>Operating Room 8</location>
        </patientupdate>
    </SOAP-ENV:Body>
</SOAP-ENV:Envelope>
```

Figure 4:
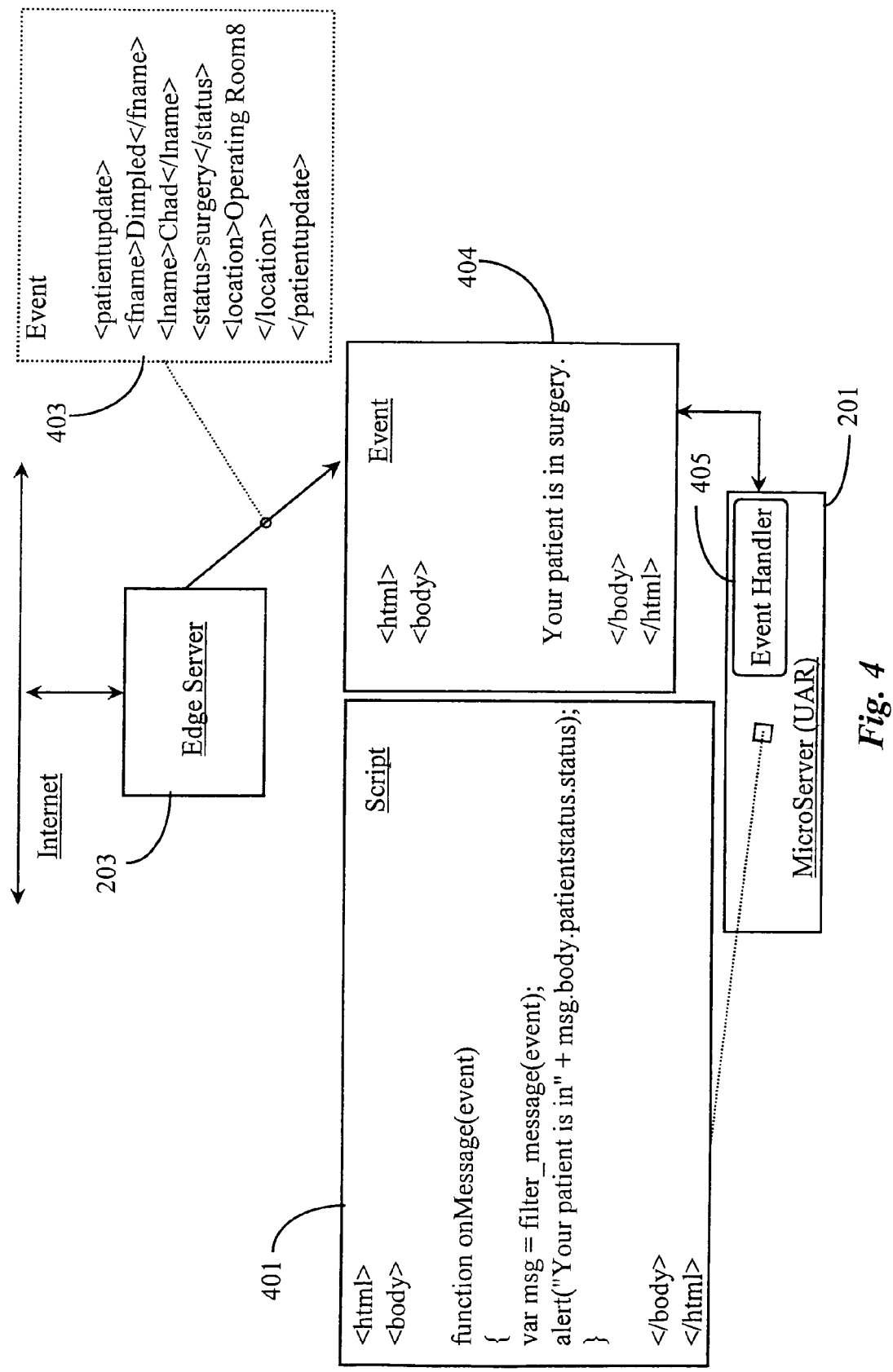
FIG. 4 is a block diagram illustrating a request/response format for messaging facilitated by the micro server of FIG. 3.

FIG. 4 is a block diagram illustrating a push format for messaging facilitated by micro server 201 of FIG. 3. In this example, edge server 203 is illustrated as connected to an Internet backbone as in previous examples. Micro server 201 communicates with edge server 203 also as previously described. Micro server 201 has a script 401 residing therein, which contains a function on Message and an alert order, presence information indicates that the user is actively receiving event pushed to micro server 201 as they occur in edge server 203. Script 401 is illustrated in expanded detail for clarity. It is noted that script, using syntax described above, is listening for the status of a patient. The script is followed by an appropriate response XML response in the form of a directed event 403 illustrated by a directional arrow labeled event associated with an event properties block given in the XML message format. After processing on the client device, the resulting displayed message is an illustrated message 404 reading "Your patient is in surgery". An event handler 405 receives message 403 and it is processed as described with reference to FIG. 3 above. It is noted herein that there may be more than one event handler active at any given time. A bi-directional arrow illustrated between event handler 405 and displayed message 404 represents micro server processing of message 403 and subsequent display of event 404 in a human readable format.

The service of the present invention is geared toward allowing pages and applications to interact without having to know the details of the other pages or applications. A common shared location or "topic" as described further above facilitates this concept. Each page or application need only be aware or know about and communicate with a topic rather than with every other page or application. Developers need only agree on the shared topics and the messages. This method is much simpler than coordinating what platforms, languages, APIs, etc. will be used as is the case with prior-art services.

Messaging can be in any format, however in a preferred embodiment messages are in XML. A sample XML for presence information may be expressed as follows:

```
<presence>
    <status>
        <code>online</code>
        <message>Available</message>
    </status>
    <person>
        <userid>/who/mike</userid>
    </person>
</presence>
```

A sample JavaScript that is generated into an object may be expressed as follows:

if (msg.body.presence.status.code=='online') alert("Online");

The service of the present invention supports well-known "Buddy Listing" and presence reporting. Following is a sample of a Buddy List Report XML:

```
<buddylist>
  <buddy>
    <status>
      <code>offline</code>
      <message></message>
      <active xsi:type='xsd:boolean'>false</active>
      <lastContactedOn>Wed Dec 31 16:00:00 PST 1969</lastContactedOn>
    </status>
    <person>
      <userid>/who/adam</userid>
      <displayname>adam</displayname>
    </person>
    <contact>
      <level>primary</level>
      <type>cellphone</type>
      <phone></phone>
    </contact>
    <subscription>
      <routeid>/who/adam/status/desto_routes/35880601</routeid>
    </subscription>
  </buddy>
  <buddy>
    <status>
      <code>offline</code>
      <message></message>
      <active xsi:type='xsd:boolean'>false</active>
      <lastContactedOn>Wed Dec 31 16:00:00 PST 1969</lastContactedOn>
    </status>
    <person>
      <userid>/who/mike</userid>
      <displayname>Mike</displayname>
    </person>
    <contact>
      <level>primary</level>
      <type>cellphone</type>
      <phone></phone>
    </contact>
    <subscription>
      <routeid>/who/mike/status/desto_routes/35880601</routeid>
    </subscription>
  </buddy>
  <group>
    <name>CoWorkers</name>
    <isExpanded xsi:type='xsd:boolean'>true</isExpanded>
    <buddyref>/who/adam</buddyref>
    <buddyref>/who/mike</buddyref>
  </group>
  <group>
    <name>Offline</name>
    <isExpanded xsi:type='xsd:boolean'>true</isExpanded>
    <buddyref>/who/adam</buddyref>
  </group>
  <isExpanded xsi:type='xsd:boolean'>true</isExpanded>
</buddylist>
```

The service of the present invention also supports the well-known instant messaging "invite" request. A sample XML for inviting one to chat follows:

```
<invite>
  <from>/who/mike</from>
  <topic>/chat/room_78285494</topic>
  <app>../Chat.esp/?inviter=/who/mike</app>
</invite>
```

There are essentially 3 properties, from (sender), topic (selected for further communication) and application (the URL that the requestor would like to visit). A sample JavaScript associated with the above XML follows:

alert("Invitation from "+msg.body.invite.from);

Event Source Development

The service of the present invention supports simplified source event development. Developers can write dynamic applications that generate events. Following are some sample applications in developer's code. The exact code written depends, of course on the libraries and languages used.

Perl

```
#!/usr/bin/perl -w
use strict;
use CGI ':standard';
use LWP::UserAgent;
use HTTP::Request::Common 'POST';
my $ua = new LWP::UserAgent;
my $server = "http://www.desto/desto/cgi-bin/desto.cgi";
my $topic = "/sample/events";
my $event = [ "displayname" => "Sample Event Generator",
              "desto_payload" => "A sample Event" ];
$ua->request(POST "$server/$topic", $event);
```

HTML

```
<form action="http://www.desto/desto/cgi-bin/desto.cgi" method="POST">
 <input name="desto_to" value="/sample/events" />
 <input name="displayname" value="Sample Event Generator" />
 <input name="desto_payload" value="A sample Event" />
 <input type="submit" value=" send event " />
</form>
```

Sending XML

Applications or Pages sending events to clients may send XML messages, which should use the following property name:

content-type:text/xml

Perl

```
#!/usr/bin/perl -w
use strict;
use CGI ':standard';
use LWP::UserAgent;
use HTTP::Request::Common 'POST';
my $ua = new LWP::UserAgent;
my $server = "http://www.desto/desto/cgi-bin/desto.cgi";
my $topic = "/sample/events";
my $event = [ "displayname" => "Sample Event Generator",
              "desto_payload" =>
```

-continued

Perl

```
"<offer><kind>buy</kind><price>1000</price></offer>",
    "content-type" => "text/xml" ];
$ua->request(POST "$server/$topic", $event);
```

HTML

```
<form action="http://www.desto/desto/cgi-bin/desto.cgi"
method="POST">
  <input name="desto_to" value="/sample/events" />
  <input name="displayname" value="Sample Event Generator" />
  <input name="content-type" value="text/xml" />
  <textarea name="desto_payload">
  <offer><kind>buy</kind><price>1000</price></offer>
  </textarea>
  <input type="submit" value=" send event " />
</form>
```

Sending SOAP

Applications or Pages sending events to clients may send SOAP messages, which should use the following property name:

soapaction:<some uri>

Perl

```
#!/usr/bin/perl -w
use strict;
use CGI ':standard';
use LWP::UserAgent;
use HTTP::Request::Common 'POST';
my $ua = new LWP::UserAgent;
my $server = "http://www.desto/desto/cgi-bin/desto.cgi";
my $topic = "/sample/events";
my $payload = <<eos;
<SOAP-ENV:Envelope
xmlns:SOAP-ENV='http://schemas.xmlsoap.org/soap/envelope/'
SOAP-
ENV:encodingStyle='http://schemas.xmlsoap.org/soap/encoding/' >
<SOAP-ENV:Header></SOAP-ENV:Header>
<SOAP-ENV:Body>
   <offer>
     <kind>buy</kind>
     <price>1000</price>
   </offer>
</SOAP-ENV:Body>
</SOAP-ENV:Envelope>
eos
my $event = [ "displayname" => "Sample Event Generator",
       "desto_payload" => $payload,
          "soapaction" => "notify",
       "content-type" => "text/xml" ];
$ua->request(POST "$server/$topic", $event);
```

HTML

```
<form action="http://www.desto/desto/cgi-bin/desto.cgi"
method="POST">
 <input name="desto_to" value="/sample/events" />
 <input name="displayname" value="Sample Event Generator" />
 <input name="content-type" value="text/xml" />
 <input name="soapaction" value="notify" />
 <textarea name="desto_payload">
 <SOAP-ENV:Envelope
```

-continued

HTML

```
xmlns:SOAP-ENV='http://schemas.xmlsoap.org/soap/envelope/'
SOAP-
ENV:encodingStyle='http://schemas.xmlsoap.org/soap/encoding/' >
<SOAP-ENV:Header></SOAP-ENV:Header>
<SOAP-ENV:Body>
   <offer>
     <kind>buy</kind>
     <price>1000</price>
   </offer>
</SOAP-ENV:Body>
</SOAP-ENV:Envelope>
  </textarea>
<input type="submit" value=" send event " />
</form>
```

Figure 5:
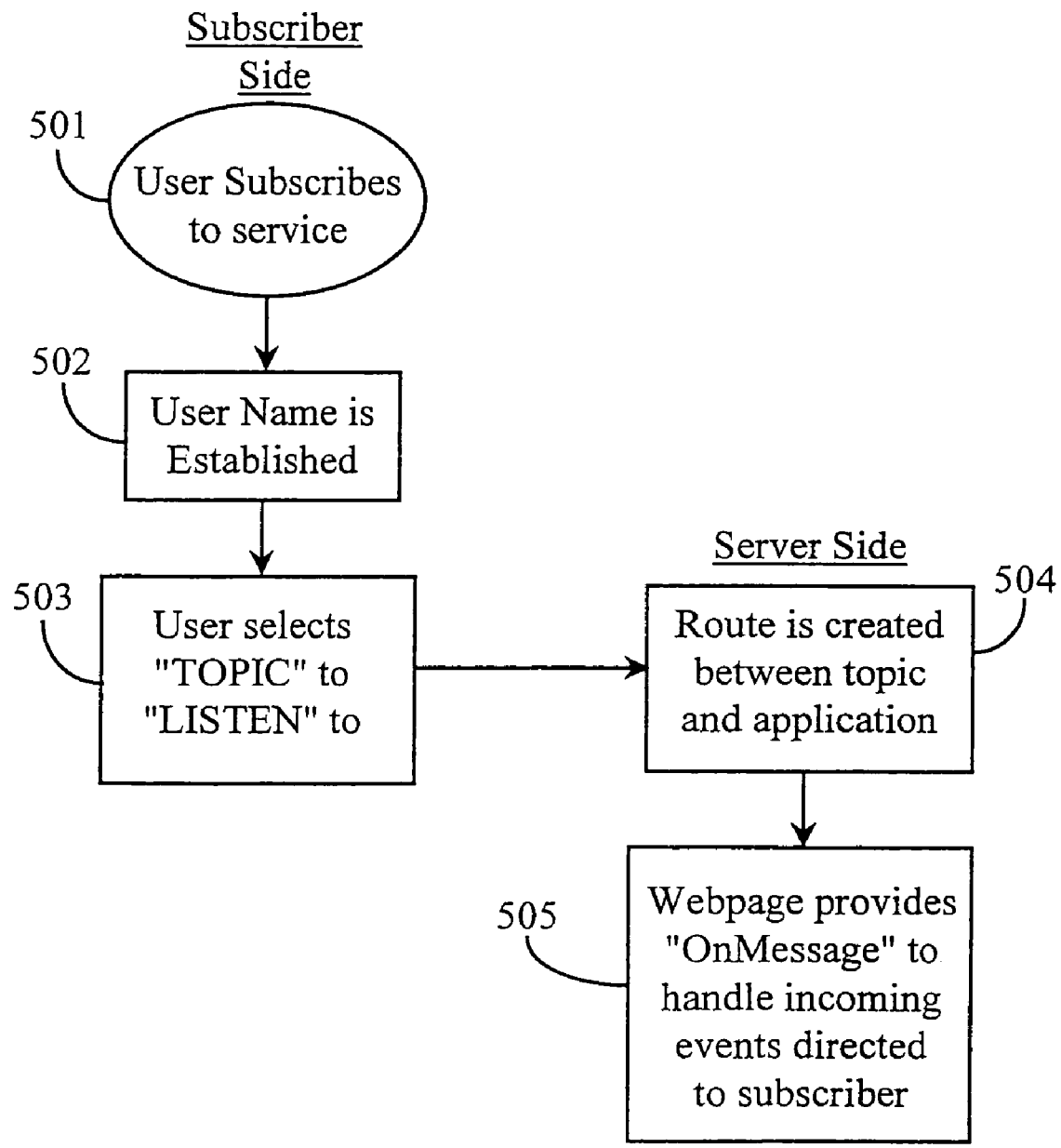
FIG. 5 is a flow diagram illustrating user/server steps for processing requests according to an embodiment of the present invention.

FIG. 5 is a flow diagram illustrating user/server steps for processing user requests according to an embodiment of the present invention. At step 501, a new user subscribes to the service of the present invention. This step may also include a sub-step for distributing the micro server application described with reference to FIG. 2 above to the users mobile device or devices. At step 502 a user name is established for the subscriber. This step may also involve establishing a password for secure interaction.

At step 503, a user selects a topic to listen to. A topic can be created or selected from a list of established topics. Listening to a topic involves sending a request to the topic and establishing a route between the selected topic and the user as exemplified by step 504, which is a server-side process. The Web page containing the topic is switched "on" for the user by activating an onMessage to handle incoming events directed to the listening user. The user may deselect the particular topic and select another topic or topics to listen to.

It will be apparent to one with skill in the art that the process steps described above may be augmented with sub-routines without departing from the spirit and scope of the present invention.

Figure 6:
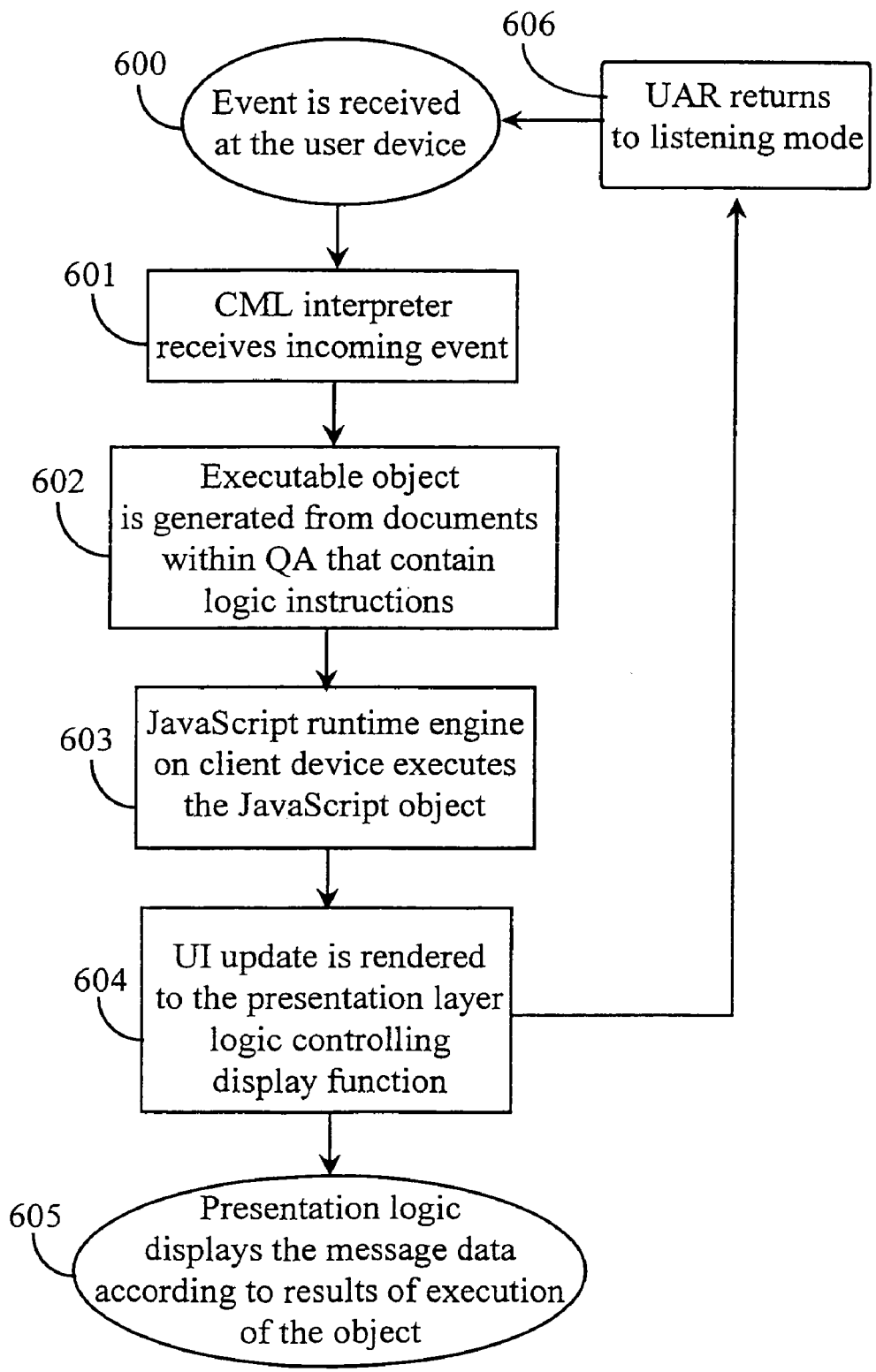
FIG. 6 is a process flow diagram illustrating steps for interpreting an event received at a client device and dynamically displaying the event data according to an embodiment of the present invention.

FIG. 6 is a process flow diagram illustrating steps for interpreting an event recieved at a client device and dynamically displaying the event data according to an embodiment of the present invention.

At step 600, an event is received at the user device. The event is in the form of compressed CML and may contain JavaScript execution instructions programmed in an original QA previously sent by the user in order to subscribe to and receive the data according to topic. At step 601, a CML interpreter analogous to CMLI 304 described with reference to FIG. 3 above receives the incoming event, decompresses the message and parses the message. At step 602 a JavaScript executable object is generated from appropriate documents within the QA that contain the logic instructions.

At step 603, A JavaScript runtime engine on the client device executes the JavaScript object to generate a preferred UI update for preferred display attributes for displaying the data and graphics, if any contained in the payload of the received message. At step 604, the UI update is rendered to the presentation layer logic controlling display function. At step 605, the presentation logic displays the message data according to the results of execution of the object. Referring now back to step 604, step 604 resolves to step 606 wherein the UAR (micro server) returns to listening mode for a next event to be pushed at step 600. Step 606 occurs immediately after step 604 is complete. Therefore steps 606 and 605 may occur simultaneously.

It is important to note herein that other functions may also be included in the object such as caching instructions, persistent storage instructions, and others according to capability of the device.

The methods and apparatus of the present invention provide an enhanced information and presence communication service that can be enabled using simple developer's language such as HTML and JavaScript. Multiple Web-based wireless markup languages are supported enabling broader inclusion of information sources to exchange information with. Moreover, server-side processing related to configuring data events for display on a variety of different device platforms as practiced in prior-art information and presence services is sharply reduced through distribution of these processing capabilities to participating client devices in a manner that does not tax the devices capabilities.

The method and apparatus of the present invention can be practiced in conjunction with virtually any type of wireless mobile device that is capable of Internet connectivity and can support the client micro server application. There are many variant embodiments both existing and those that may be envisioned. Therefore, the method and apparatus of the present invention should be afforded the broadest possible scope under examination.

The method and apparatus of the present invention is limited only by the claims that follow.

What is claimed is:

1. A network-based system for routing data between software applications with access to a network, said system comprising:
   at least one router connected to the network for establishing and maintaining routes between the router and the software applications according to request;
   a first version of software residing in and executable from the at least one router for controlling route creation and deletion and converting incoming data of differing markup languages into a common format;
   at least one client device connected to the network, the at least one client device adapted for communication with the at least one router, wherein the at least one client device sends requests for data to the at least one router, wherein the request for data is of the form of XML or SOAP, wherein the requested data is sent from the at least one router and received by the client device, and wherein the data received is in the common format, wherein the common format is compact markup language; and
   a second version of software residing in and executable from the at least one client device for determining how the data received is rendered for use by the client device; wherein the at least one client device reads the data received and builds an object model from logic instructions embedded in the data received and wherein the at least one client device executes the object model to implement the logic instructions at the client device for rendering display of the data received, and wherein the object model is of the form of javascript.

2. The network-based system of claim 1 wherein the network is the Internet network.

3. The network-based system of claim 1 wherein the software applications comprise both network applications and client applications.

4. The network-based system of claim 3 wherein the software applications subscribe to data according to a shared topic.

5. The network-based system of claim 1 wherein the at least one client device is a mobile device connected to the network through a wireless network.

6. The network-based system of claim 5 wherein in the case of more than one client devices, the client devices comprise a mix of different types and platforms.

7. The network-based system of claim 1 wherein the second version of software is a distributed server application having full Web browser functionality.

8. The network-based system of claim 1 wherein the logic instructions are JavaScript and the object model is an executable JavaScript object.

9. The network-based system of claim 1 wherein the requested data sent from the at least one router and received by the at least one client device is XML.

10. The network-based system of claim 1 wherein the logic instructions embedded in the data received by the at least one client device does not include rule sets for data display on the client device.

11. The network-based system of claim 1 wherein the data received is rendered on the client device based on a display profile of the client device.

12. The network-based system of claim 11 wherein the display profile of the client device comprises a screen size and a display capability of the client device.

13. The network-based system of claim 1 wherein the request for data sent to the at least one router includes an HTML template, and wherein the at least one router returns the HTML template populated with the requested data.

14. The network-based system of claim 1 wherein the object model is stored, wherein the at least one client device receives updated data sent from the at least one router, and wherein the stored object models is reused with the updated data.

* * * * *